Oct. 5, 1937.  E. J. HOUDRY  2,094,601
APPARATUS FOR CHEMICAL REACTIONS
Filed April 27, 1935
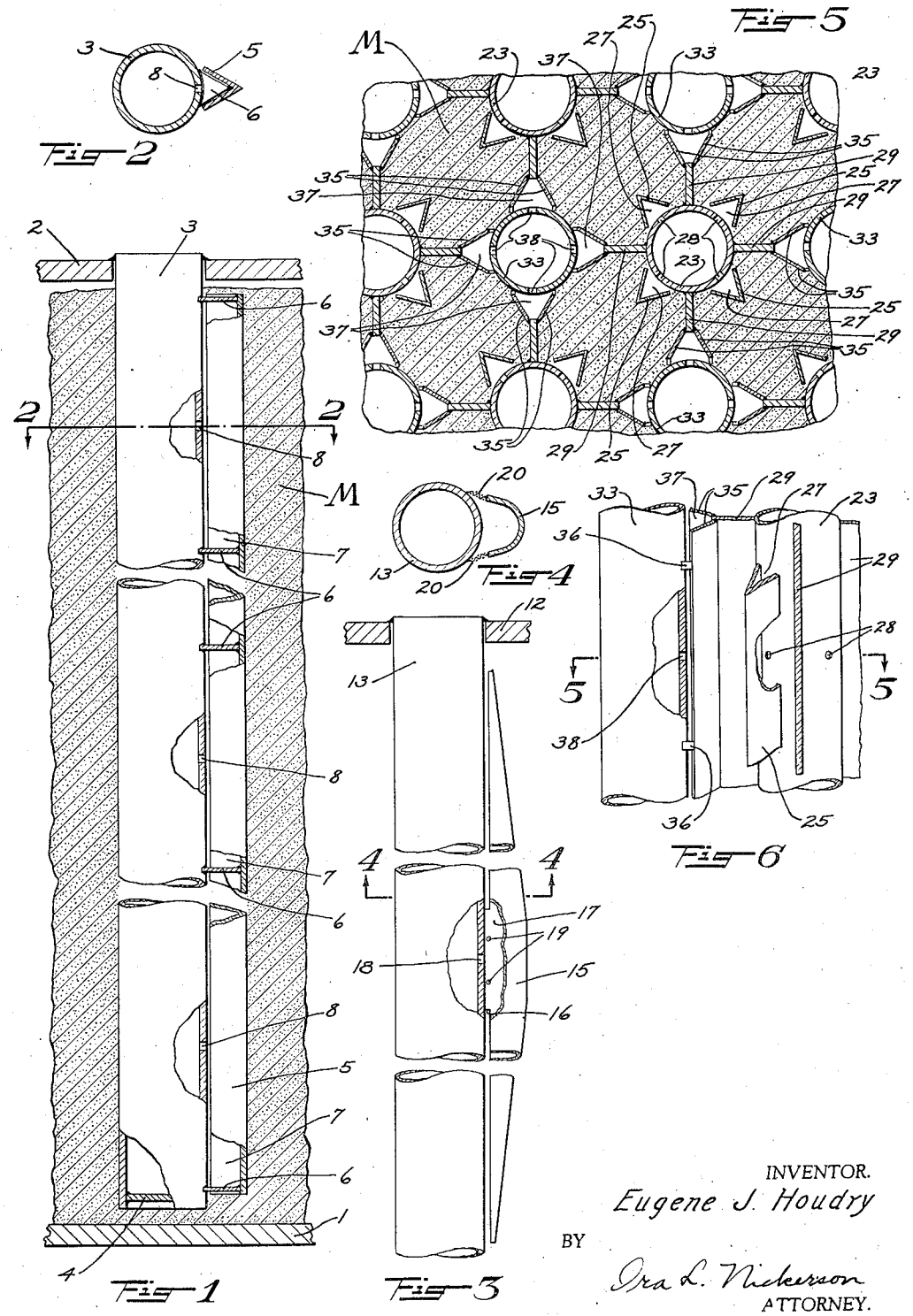
INVENTOR.
Eugene J. Houdry
BY
Ira L. Nickerson
ATTORNEY.

Patented Oct. 5, 1937

2,094,601

UNITED STATES PATENT OFFICE 2,094,601

APPARATUS FOR CHEMICAL REACTIONS

Eugene J. Houdry, Philadelphia, Pa., assignor to Houdry Process Corporation, Dover, Del., a corporation of Delaware Application April 27, 1935, Serial No. 18,601

12 Claims. (Cl. 23—288)

The present invention relates to apparatus for effecting chemical transformations by the use of contact masses. More particularly it concerns distribution of reactants and removal of products as by the use of fluid distributing and/or outlet conduits embedded in the contact masses. In certain aspects, the present invention may be considered an improvement on or further development of certain prior inventions including that disclosed in my copending application, Serial No. 12,564, filed March 23, 1935.

Heretofore the fluid distributing conduits which were embedded in the contact masses have been tubes having one or more rows of small openings extending the length of the tube. Such rows of openings present a difficult problem in design since the best operation requires the closest approach possible to uniform distribution of reactants throughout the mass and thus maintenance of uniform operating conditions. If the holes are spaced too far apart, portions of the contact mass do not receive the proper amount of fluid. If a very large number of openings are provided, difficulties are encountered in securing an even distribution of fluid from all of the openings. In addition to the above, the expense of drilling a large number of accurately spaced and sized holes considerably increases the cost of the fluid conduits.

Therefore, it is an object of this invention to provide a fluid conduit, adapted to be embedded in a contact mass, which will provide uniform flow of fluid throughout the length of the conduit, either from the conduit into the mass or from the mass to the conduit, without the necessity of providing a large number of openings in the conduit. Other and further objects will appear as the description progresses.

In order to illustrate the invention, concrete embodiments thereof are shown in the accompanying drawing, in which:

Fig. 1 is a fragmentary sectional view, showing a portion of a casing providing a reaction chamber which contains a contact mass, and having a conduit for distributing fluid in or removing fluids from the contact mass;

Fig. 2 is a sectional view of the conduit shown in Fig. 1 taken on the line 2—2 of Fig. 1;

Fig. 3 is a partial elevation of a modified form of fluid distributing conduit;

Fig. 4 is a transverse sectional view of a conduit taken substantially on the line 4—4 of Fig. 3 and indicating a modification;

Fig. 5 is a section taken through contact mass showing a modified arrangement with two series of conduits; and Fig. 6 is a fragmentary elevation of the types of conduits shown in Fig. 5.

Fig. 1 indicates a portion of a casing or converter providing a chamber containing a contact mass M of catalytic or other material suitable for effecting the desired conversion, transformation or modification of the starting material, and having a series of fluid distributing and fluid outlet elements extending into the reaction chamber and embedded in, or transversing the contact mass M. To simplify the disclosure, only a portion of two walls of the reaction chamber are shown, namely the bottom or supporting wall 1 for the contact mass, and the top wall 2, and only one fluid conducting element, which may be either a fluid inlet or a fluid outlet is shown. The element comprises a tube 3 one end of which extends through the top wall 2, to which it may be secured in any suitable manner as by welding. Tube 3 extends through the reaction chamber to a point near the opposite wall 1 thereof, the free end of tube 3 being closed in any suitable manner as by a disk 4 welded in the end thereof. One or more channel members or angle bars 5, of which one only is shown for the sake of clearness, are attached to the walls of tube 3 by suitable spacers or supports 6, secured to the wall of tube 3 and to angle bar 5 in any suitable manner as by welding. The angle bar 5 is spaced from the wall of tube 3 by spacers 6 a sufficient distance to provide a uniform longitudinal opening between the edges of angle bar 5 and the wall of tube 3 of sufficient size for the passage of fluid but small enough to prevent any of the contact mass M from passing under the edges of angle bar 5. Angle bar 5 forms a longitudinal chamber along the side of tube 3 which is divided into a series of longitudinal chambers 7 by triangular spacers 6. One or more holes or openings 8 in tube 3 are provided under each of the chambers 7.

In operation a fluid to be distributed through the contact mass M is introduced into tube 3 from which it flows through opening 8 into chambers 7, thence it flows through the longitudinal openings between the wall of tube 3 and the edges of angle bar 5 into the contact mass M. From this description it is apparent that this type of fluid distributing conduit will provide uniform flow throughout its length into the contact mass. Conversely, if tube 3 is a fluid outlet, there will be uniform flow, throughout the length of the tubes 3, of fluid from the contact mass M, through the longitudinal openings between the edges of angle bar 5 and the wall of tube 3 to the chambers 7 and thence out of the reaction chamber.

The forms of fluid distributing conduit shown in Figs. 3 and 4 comprise a tube 13 one end of which extends through a wall 12 of a reaction chamber and which is secured thereto as by welding. One or more U-shaped members 15, narrowed at their ends, one only being shown for the sake of clearness, extending lengthwise of tube 13 are attached to the wall thereof and are spaced therefrom in any suitable manner as by projections 16 on member 15 being welded to tube 13. Member 15 forms a longitudinal chamber 17 along the wall of tube 13 from which fluid may flow through the longitudinal openings between the edges of U member 15 and the wall of tube 13, several openings or holes 19 being provided in projections 16 to permit flow at this point. One or more openings 18 are provided centrally of tube 13 under the chamber 17. If desired, means such as a wire mesh 20 (Fig. 4) may be placed between the edges of U member 15 and the walls of tube 13 to prevent any particles of the contact mass from entering the chamber 17.

The operation of this type of fluid distributing conduit will be similar to that of the conduit shown and described in connection with Figs. 1 and 2. When used as a fluid inlet, fluid will be admitted to tube 13 and will flow through opening 18 to chamber 17 and thence through openings 19 and the longitudinal opening between the edges of U member 15 and the wall of tube 13 to the contact mass. When used as a fluid outlet, the fluid will flow from the contact mass M through the longitudinal openings between the edges of U member 15 and the walls of the tube 13 and through openings 19 to chamber 17, thence through openings 18 to tube 13 and thence out of the reaction chamber. Member 15 is tapered toward its ends to effect uniform flow of fluid throughout the length of tube 13 to or from the contact mass M.

Referring now to Figs. 5 and 6, two series of tubes 23 and 33 are arranged symmetrically in juxtaposed parallelism, and embedded in contact mass M. One series of these tubes will serve as fluid inlet conduits and the other series as fluid outlet conduits. Angle bars 25 extending lengthwise of tubes 23 are placed about tubes 23 and are spaced therefrom a slight distance so as to provide a fluid passageway between the edges of angle bars 25 and the walls of tubes 23. These angle bars 25, four of which are shown, spaced equidistantly about the circumference of each of the tubes 23, may be secured to tubes 23 in any suitable manner, for instance in the manner described in connection with Figs. 1 and 2, and form a plurality of longitudinal chambers 27 about each of tubes 23. One or more openings 28 are provided in tubes 23 under each chamber 27. Radially extending longitudinal fins 29 are secured to each of tubes 23 between the angle bars 25. One edge of each of two diverging plates 35 is secured to the outer edges of each of fins 29 in any suitable manner, as by welding. The outer edges of the diverging plates 35 have stops or lugs 36 to engage tubes 33, each pair of diverging plates 35 thus forming a longitudinal chamber 37, along the side of one of the tubes 33, with the edges of plates 35 slightly spaced from the walls of the tubes 33 to form a fluid passageway therebetween. One or more openings 38 are provided in the walls of the tubes 33 under each chamber 37.

The operation of this type and arrangement of fluid distributing members is as follows: Assuming the reaction taking place within the reaction chamber to be strongly exothermic, the reactants will preferably be admitted through tubes 33 at a temperature within the range of the reaction or slightly therebelow. The reactants will flow through openings 38 into chambers 37 from thence they will flow uniformly through the longitudinal openings between the edges of plates 35 and the walls of tubes 33 into the contact mass M. The reaction products pass from the mass uniformly through the nearest longitudinal openings between the edges of angle bars 25 and the walls of tubes 23 into the chambers 27, and thence through openings 28 into tubes 23 and thence out of the reaction chamber. In the meantime the plates 35 and fins 29 and angle bars 25 conduct heat from all portions of the mass to the tubes 23; from thence it may be removed in any desired manner, for instance in the manner described in my copending application Serial No. 12,564, filed March 23, 1935, no particular manner being shown herein since it forms no part of the present invention. If the reaction is endothermic, the movement of reactants through the mass may be in the same direction as described above or in the opposite direction. If in the opposite direction, the reactants will enter through tubes 23 flowing thence through openings 28 to chambers 27 and thence uniformly through the longitudinal openings between the edges of angle bars 25 and the walls of tubes 23 to the reaction mass. The reaction products from the mass may flow uniformly through the longitudinal openings between the edges of the plates 35 and the walls of the tubes 33 to the chamber 37 thence through openings 38 to tubes 33 and thence out of the reaction chamber.

From the above it will be apparent that the present invention permits the attainment in a measure and by different structure of certain advantages of the nested conduit elements disclosed in United States Patents Nos. 1,987,903 and 1,987,904, issued to me on January 15, 1935, in that there will be a considerable degree of heat exchange between the mass and an entering fluid before the latter reaches the mass and between the mass and a fluid leaving the latter. Moreover, the invention facilitates the uniform feeding of reactants within the mass and the uniform removal of products therefrom throughout the depth and cross sectional extent of the reaction chamber and is capable of utilization in the application of the processes set forth in my copending application Serial No. 611,362, filed May 14, 1932, which issued on June 2, 1936, as Patent No. 2,042,468. For such uniform movement of fluid, it is essential that there be substantially no pressure drop in the chambers on the exterior of the conduit. Hence the conduit members of the present invention will not function properly to produce an even flow of fluid at all points unless they are completely surrounded and embedded in a contact mass of reasonably uniform density. In this respect, they differ from the nested conduit units disclosed in the aforesaid issued patents and copending applications which are designed to produce the same flow at all perforations even when not embedded in a contact mass.

What I claim and desire to protect by Letters Patent is as follows:

1. The combination with a contact mass of a conduit embedded therein for distributing or removing fluid, a channel member, means mounting said member in slightly spaced relation to said conduit and dividing the interior of said member into a plurality of chambers, each chamber communicating with said mass throughout its length, said conduit having at least one port communicating with each of said chambers.

2. The combination with a contact mass of a conduit embedded therein for distributing or removing fluid, a member mounted upon and extending along the length of the exterior of said conduit and forming an elongated chamber tapering toward its extremities, said member having its sides spaced slightly from said conduit to provide a passage for communication with said mass, said conduit having at least one port therethrough at the central portion of said member communicating with the enlarged portion of said chamber.

3. The combination with a contact mass of a conduit embedded therein for distributing or removing fluid, said conduit having series of aligned ports, and elongate means providing an elongate chamber located over the ports of each of said series and in spaced relation to said conduit for keeping said mass away from said ports but effecting diffusion of fluid through said mass or withdrawal of fluid therefrom, each of said elongate means extending around a part only of the circumference of said conduit.

4. The combination with a contact mass of conduits embedded therein in spaced relation, one of said conduits having ports in the wall thereof, and means disposed over said ports for keeping said mass away from said ports but permitting movement of fluid between said ports and said mass, said means being mounted on a conduit adjacent to the one having said ports.

5. The combination with a contact mass of conduits embedded therein in spaced symmetrical arrangement, one of said conduits having ports in the wall thereof, and members mounted on and extending from adjacent conduits over said ports to exclude said mass therefrom but establishing free communication with a greatly increased portion of said mass, each of said members providing an elongated chamber and being spaced from said one conduit and extending around a part only of its circumference.

6. The combination with a contact mass of a conduit embedded therein for distributing or removing fluid, a plurality of ports in the wall of said conduit, and means providing an elongated chamber extending along said conduit and located adjacent thereto, over at least one of said ports, said means being located in slightly spaced relation to said conduit, extending around a part only of the circumference thereof, and being adapted to diffuse fluid through said mass or to withdraw fluid therefrom, substantially as uniformly at points intermediate said ports as at points adjacent to them.

7. The combination with a contact mass of a conduit embedded therein for distributing or removing fluid, a plurality of ports in the wall of said conduit, and means comprising a plurality of elements, each providing an elongated chamber and extending along said conduit and located adjacent thereto over at least one of said ports, each of said means being located in slightly spaced relation to said conduit, extending around a part only of the circumference thereof, and being adapted to keep said mass away from said ports and to diffuse fluid through said mass or to withdraw fluid therefrom, substantially as uniformly at points remote from said ports as at points adjacent thereto.

8. The combination with a contact mass of a conduit embedded therein for distributing or removing fluid, a plurality of ports in the wall of said conduit, and an element providing an elongated chamber extending along said conduit for at least a portion of its length and located adjacent thereto over at least one of said ports and extending around a part only of the circumference of said conduit, said element being located in slightly spaced relation to said conduit and being adapted to keep said mass away from the said port and to diffuse fluid through the mass or to withdraw fluid therefrom, substantially as uniformly at points remote from said port as at points adjacent thereto.

9. In combination, a converter having a reaction chamber adapted to contain a contact mass, a fluid conduit located within said reaction chamber, and a plurality of means each extending along the length of said fluid conduit within said reaction chamber so as to provide a plurality of longitudinal chambers each spaced from another around said conduit, supports holding each of said means in relation to said conduit so that the edges of each are spaced from said fluid conduit along the length thereof to provide elongated passageways between said means and said conduit, thereby to provide for substantially uniform movement of fluid between each unit length of each of said chambers and the surrounding reaction chamber, said conduit having openings in the walls thereof communicating with each of said chambers.

10. In apparatus for effecting chemical reactions a converter providing a reaction chamber, a contact mass therein, two series of fluid conduits extending into said mass in symmetrical arrangement to effect distribution of reactants within the said mass and removal of reaction products from within said mass, means providing longitudinal chambers exteriorly of one of said series of conduits, means effecting communication between said mass and said chambers substantially throughout the length of the latter, means effecting communication between said chambers and the interior of the conduits of said series, and radial fins on said series having outer ends forming a second series of longitudinal chambers exteriorly of said second series of conduits and means effecting communication between the interior of said second series of conduits and said last named chambers and between the latter and said contact mass.

11. A fluid conducting element adapted to be embedded in a contact mass, which comprises a fluid conduit, a channel member along the wall of said conduit forming a longitudinal chamber therealong, spacers connecting said member to said conduit and spacing the edges of said member from the wall of said conduit to form fluid passageways therebetween and to divide said chamber into a series of longitudinal chambers, said conduit having an opening in the wall thereof communicating with each of said last named chambers.

12. A fluid conducting element adapted to be embedded in a contact mass for distributing fluid therein or removing fluid therefrom, comprising a conduit having ports therein, channel members mounted over said ports with their sides in slightly spaced relation to the conduit to form fluid chambers from which the contact mass will be excluded, supports projecting from said conduit intermediate said chambers, and additional channel members on the outer ends of said supports to form similar fluid chambers adjacent the walls and over the ports of other conduits.

EUGENE J. HOUDRY.